(12) United States Patent
Kumar et al.

(10) Patent No.: US 8,991,692 B2
(45) Date of Patent: Mar. 31, 2015

(54) MANAGING COMPONENT INFORMATION DURING COMPONENT LIFECYCLE

(71) Applicant: The Boeing Company, Chicago, IL (US)

(72) Inventors: Anil Kumar, Sammamish, WA (US); Steven Bates, Tacoma, WA (US); Kevin Y. Ung, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 18 days.

(21) Appl. No.: 13/914,294

(22) Filed: Jun. 10, 2013

(65) Prior Publication Data

US 2014/0361074 A1    Dec. 11, 2014

(51) Int. Cl.
| | |
|---|---|
| G06F 17/00 | (2006.01) |
| G06F 7/00 | (2006.01) |
| G06K 19/00 | (2006.01) |
| G06K 19/06 | (2006.01) |
| G06F 17/30 | (2006.01) |

(Continued)

(52) U.S. Cl.
CPC ...... *G06F 17/30011* (2013.01); *G06Q 10/0875* (2013.01); *G06Q 10/20* (2013.01); *G06Q 50/04* (2013.01)
USPC ........... 235/376; 235/375; 235/487; 235/492; 707/610; 707/621

(58) Field of Classification Search
CPC ........ G07C 5/0845; G07C 3/00; G07C 5/006; G07C 9/00111; G06K 19/07749; B64F 5/0045
USPC .......................... 235/375, 376, 380, 485, 492; 707/610–617, 621
See application file for complete search history.

(56) References Cited

U.S. PATENT DOCUMENTS 7,227,468 B1 *  6/2007  Florio ........................ 340/572.1
7,298,264 B1 * 11/2007  Kuzma et al. ............... 340/572.1

(Continued)

FOREIGN PATENT DOCUMENTS

WO    2011070536 A2    6/2011

OTHER PUBLICATIONS

European Application Serial No. 14171483.2, Search Report mailed Oct. 29, 2014, 7 pgs.

*Primary Examiner* — Thien M Le
*Assistant Examiner* — Claude J Brown
(74) *Attorney, Agent, or Firm* — Kwan & Olynick LLP

(57) ABSTRACT

Provided are methods and systems for managing various component information during component lifecycles. The information may be collected and made available starting with fabrication of a component and throughout various operations that the component may be a part of. A component may be associated with an identifier, such as a barcode or a radio frequency identifier (RFID) tag, containing identifier information. The identifier information may be used to retrieve additional component information, such as fabrication information, assembly information, installation information, maintenance information, spare part number availability, ordering/expedite systems, digital geometry files, drawings, service history, interdependencies, warranty information, available upgrades or alerts, required regulatory actions or notices for presenting on a user interface of the reader. The component information may be available in the on-board memory of the reader and/or retrieved by the reader from a server.

20 Claims, 6 Drawing Sheets

(51) Int. Cl.
  *G06Q 10/08*  (2012.01)
  *G06Q 10/00*  (2012.01)
  *G06Q 50/04*  (2012.01)

(56) References Cited

U.S. PATENT DOCUMENTS

| | | | |
|---|---|---|---|
| 8,212,673 B1 | 7/2012 | Whittaker | |
| 2002/0167393 A1* | 11/2002 | Mabuchi et al. | 340/5.3 |
| 2003/0061005 A1* | 3/2003 | Manegold et al. | 702/182 |
| 2004/0024570 A1* | 2/2004 | Muehl et al. | 702/184 |
| 2005/0162256 A1* | 7/2005 | Kinoshita | 340/10.41 |
| 2007/0114280 A1 | 5/2007 | Coop et al. | |
| 2007/0241908 A1 | 10/2007 | Coop | |
| 2008/0101606 A1* | 5/2008 | Silverbrook et al. | 380/243 |
| 2008/0278328 A1* | 11/2008 | Chand et al. | 340/572.1 |
| 2008/0284571 A1* | 11/2008 | Wilbrink et al. | 340/10.1 |
| 2010/0097195 A1* | 4/2010 | Majoros et al. | 340/10.6 |
| 2012/0016535 A1 | 1/2012 | Lee et al. | |
| 2012/0111939 A1* | 5/2012 | Silverbrook et al. | 235/380 |
| 2012/0130946 A1* | 5/2012 | Huang et al. | 707/617 |
| 2014/0002278 A1* | 1/2014 | Boomgaarden et al. | 340/945 |

* cited by examiner

US 8,991,692 B2

MANAGING COMPONENT INFORMATION DURING COMPONENT LIFECYCLE

BACKGROUND

Managing dynamic information related to various components subject to different processes may be cumbersome. For example, a component may be manufactured by one party, operated by another party, and serviced by yet another party. Furthermore, components may be integrated into various assemblies, taken out of the assemblies and replaced with new components. Some components do not require precise and individualized information, which greatly simplifies the information management task. However, some components, such as aircraft parts, assemblies, and systems, may require precise information to ensure, for example, safety, continuous operation, and other criteria associated with these components and assemblies that these components are parts of. The information management for such components may require coordinated information exchange between different parties, storing historical information, making relevant information available when requested, tying information to particular components, and other such tasks.

SUMMARY

Provided are methods and systems for managing various component information during component lifecycles. The information may be collected and made available starting with fabrication of a component and throughout various operations that the component may be a part of A component may be associated with an identifier, such as a quick response (QR) code, a barcode or a radio frequency identifier (RFID) tag. The identifier contains identifier information that may be obtained by a reader. The identifier information may be used to retrieve additional component information, such as fabrication information, assembly information, installation information, maintenance information, spare part number availability, ordering/expedite systems, digital geometry files, drawings, service history, interdependencies, warranty information, available upgrades or alerts, required regulatory actions or notices for presenting on a user interface of the reader. The component information may be available in the on-board memory of the reader and/or retrieved by the reader from a server. In some embodiments, the reader may be also used to update the component information based, for example, on inspection or maintenance performed on the component by the user.

For purposes of this document, component information may also include system information corresponding to a system that a component may be a part of. For example, component information may include information about the fabrication and assembly of components, sub-assemblies, assemblies, systems, and other groupings of multiple components. Furthermore, methods described herein may be used to manage system information, which in some embodiments, is performed in addition to managing individual component information. Overall, the term "component information" may be used interchangeably with the "system information" term.

Furthermore, while various references are made to maintenance information, the methods and systems described herein may be used to manage other types of information as well, which is generally referred to as component information. The component information may cover one or more phases or, in some embodiments, the entire lifecycle of a component or a system. For example, the component information may include various aspects of fabrication information, assembly information, and installation information. In the context of assemblies and sub-assemblies, the component information may include part specific information (e.g., part fabrication information) as well as assembly information.

In some embodiments, the component information extends beyond the lifecycle of the component. For example, the component information may be retained and used even after the component is discarded, e.g., replaced by another component. The information corresponding to the discarded component may be retained to compare with information corresponding to a new component, troubleshooting, and other purposes.

In some embodiments, a method for managing component information during component lifecycle involves obtaining identifier information from an identifier. The identifier is associated with a component, which may be subject to maintenance. The identifier information is obtained using a reader. The method proceeds with determining availability of maintenance information or, more generally, availability of component information in an on-board memory of the reader. The maintenance information corresponds to the identifier information. As such, the maintenance information may be specific to the component associated with the identifier. If the maintenance information is not available in the on-board memory of the reader, the method may proceed with sending a request to a maintenance server for the maintenance information and receiving a response from the maintenance server corresponding to the request. In some embodiments, the maintenance server may include other types of information, such as fabrication information, assembly information, installation information, maintenance information, spare part number availability, ordering/expedite systems, digital geometry files, drawings, service history, interdependencies, warranty information, available upgrades or alerts, required regulatory actions or notices. In general, a server storing this information and communicatively coupled to a reader may be referred to as a component information server or simply a component server.

The response may include the entire maintenance information or a part of it. In some embodiments, the information received from the maintenance server may be combined with the information available in the on-board memory of the reader. The method may proceed with presenting an output on a user interface of the reader. The output may include the identifier information, the maintenance information, and the response received from the maintenance server.

In some embodiments, the method also involves sending a request to update the maintenance information to the maintenance server. At least a portion of this request to update the maintenance information may be generated automatically by the reader. For example, the automatically generated portion may include a current date, an identification of the reader, and an identification of a user of the reader. In some embodiments, at least a portion of the request to update the maintenance information includes data added by a user of the reader. In some embodiments, the method may involve verifying a version of the maintenance information available on the on-board memory of the reader. For example, the on-board memory of the reader may have a file containing a maintenance manual. Prior to presenting this manual on the user interface, the reader may check with the maintenance server to ensure that this maintenance manual is current.

In some embodiments, the identifier may include an RFID tag, QR code, and/or a barcode. The identifier may also include an alphanumeric code. The type of an identifier determines the type of a reader that is needed to obtain identifier information from the identifier. Thus, obtaining the identifier information may involve interrogating the identifier using an RFID reader, QR code reader, and the like.

In some embodiments, the method may involve updating the identifier information. For example, a recordable RFID tag may be used as an identifier and allow to change or add to the information previously stored on the tag. In some embodiments, identifier information may be updated by adding a new identifier, for example, in addition to or instead of the previous identifier. For example, a new label with a new barcode may be attached to a component after completing maintenance on this component.

In some embodiments, the output presented on the user interface of the reader includes maintenance instructions, maintenance history, component fabrication history, and/or aircraft assembly history. Other types of information that may be presented on the user interface include, but not limited, fabrication information, assembly information, installation information, spare part number availability, ordering/expedite systems, digital geometry files, drawings, service history, interdependencies, warranty information, available upgrades or alerts, required regulatory actions or notices. As noted above, this output may be collected from one or more of the identifier information, the maintenance information, and the response from the maintenance server. For example, a part of the maintenance history may come from the identifier information, another part from the maintenance information, and yet another part from the response from the maintenance server.

In some embodiments, the method also involves authenticating the request by the maintenance server. The authentication may be performed based on login information received from the reader, media access control (MAC) address of the reader, and other parameters. In some embodiments, the response received from the server is encrypted. The request may be sent and the response may be received over the Internet. Use of the Internet allows integrating different parties that may have component information, such as original equipment manufacturers (OEMs), operators (e.g., airlines), maintenance technicians, and others. In some embodiments, the component is an aircraft component. This aircraft component may be already installed on an aircraft or may be used in the method as a standalone component.

In some embodiments, a method for managing component information during component lifecycle involves receiving a first request for retrieving maintenance information. The first request may be received from a reader and includes identifier information. This identifier information is then used for retrieving the maintenance information from a database, such that the maintenance information is associated to the identifier information. In some embodiments, the maintenance information includes maintenance instructions, maintenance history, component fabrication history, and/or aircraft assembly history. The maintenance information is then sent to the reader.

In some embodiments, the method also involves receiving, from the reader, a second request for updating the maintenance information. The method then proceeds with updating the maintenance information in the database to create updated maintenance information. The updated maintenance information may be then sent to the same or to an additional reader. In some embodiments, the method also involves receiving additional identifier information and associating the additional identifier information with the maintenance information.

Provided also is a computer system for managing component information during component lifecycle. The computer system may include an identifier interface module for obtaining identifier information from an identifier, a memory module for storing local maintenance information (or, more generally, component information), a processing module for analyzing the identifier information to determine availability of maintenance information in the memory module, a communication module for sending a request to a maintenance server for the maintenance information and for receiving a response from the maintenance server, and a user interface for displaying an output. The output may include the identifier information, the maintenance information, and/or the response from the maintenance server. In some embodiments, the output may also include one or more of the following information: fabrication information, assembly information, installation information, spare part number availability, ordering/expedite systems, digital geometry files, drawings, service history, interdependencies, warranty information, available upgrades or alerts, required regulatory actions or notices These and other embodiments are described further below with reference to the figures.

DETAILED DESCRIPTION OF EXAMPLE EMBODIMENTS

Figure 1:
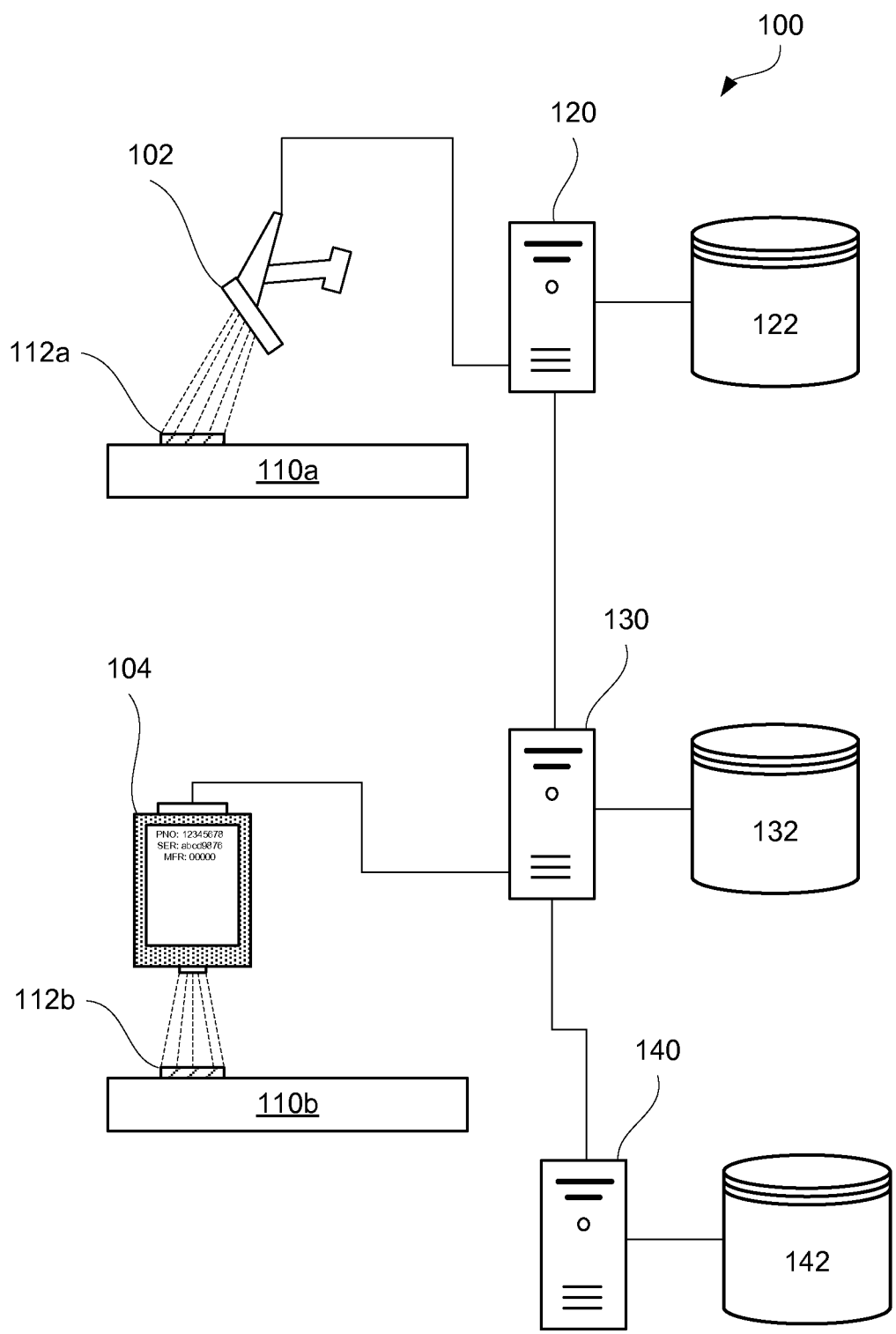
FIG. 1 is a schematic illustration of a system including multiple readers and servers communicatively coupled to the readers, the system configured to manage component information during component lifecycle, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.
Introduction Maintenance and other tasks performed during lifecycle of complex components and systems, such as aircraft, often require coordination of multiple different types of information. For example, information from original equipment manufacturers (OEMs) may need to be combined with information from service providers and information from part suppliers, and the like. Some of this information may be dynamic and may be updated by different entities. As such, information integration may be an on-going effort. Furthermore, in addition to aggregating and updating information, correct, relevant, and up-to-date information needs to be provided to various requesting parties. For example, aircraft maintenance personnel may need access to part catalogs, maintenance manuals, wiring diagrams, maintenance training manuals, in-service activity reports, repair records, and service letters. The same maintenance personnel may then generate records of completed maintenance. Overall, much information may be retrieved, supplied, and updated by various different parties during component lifecycle.

Various types of information may be involved during the lifecycle of a component, such as fabrication information, assembly information, installation information, maintenance information, spare part number availability, ordering/expedite systems, digital geometry files, drawings, service history, interdependencies, warranty information, available upgrades or alerts, required regulatory actions or notices. It should be noted that the information management sometimes extends even beyond the lifecycle of the component, such as after replacing the component with another one. The information may be retained for troubleshooting, comparison, and other purposes.

The OEM may control the original documents associated with a component, such as bill of materials, fabrication records, and maintenance instructions. This control ensures the integrity and accuracy of some documents. However, operators (e.g., airlines) often need to make certain types of changes to the OEM documents, either for their own business purposes or to satisfy certain regulatory requirements. For example, airlines may wish to add or append their own data to the OEM maintenance documents. In the past, these scenarios often created multiple clusters of information controlled and accessed by individual entities and generally not available to other entities. Little if any exchange of information among entities existed in part because back end systems lacked integration and components were difficult to identify in a uniform manner. Furthermore, entities generally limited access to their back end systems to their staff.

Methods of managing component information allow accurate and timely recording of build/assembly status and records by the OEM during the initial production. This initial production is part of the lifecycle and also within the scope of this case.

Provided are methods and systems for managing component information during component lifecycle. A component may have one or more identifiers associated with it, such as QR code, a barcode, an RFID tag, and/or an alpha-numeric code. An identifier may be created and associated with the component by its supplier (e.g., OEM), operator (e.g., an airline), or some other party (e.g., maintenance provider). For example, a barcode label may be attached to the part after it has been fabricated. It should be noted that while an identifier may be attached to the component that it is associated with, it does not have to be. For example, an identifier may be present in another location, such as a maintenance log book, and logically associated with the component or an assembly.

In some embodiments, different identifiers may be linked to each other. For example, multiple identifiers may be associated with the same component, such as a barcode and an RFID tag attached to the same part. In another situation, multiple identifiers may be associated with different components of the same type, such as components having the same part number or different serial numbers. In yet another situation, multiple identifiers may be associated with different components that are part of the same assembly. For example, the tail number of an aircraft may be linked to all identifiers associated with components of this aircraft. In some embodiments, the system may have a tree-like correspondence scheme reflecting various assemblies and subassemblies. This scheme may be used to retrieve information for different components without obtaining identifier information for each of these components. Furthermore, the system may be updated when a new identifier is added or an existing identifier is removed due to, for example, replacement of the component.

An identifier encodes identifier information, which may include one or more pointers for retrieving additional information. For example, identifier information may include a link to one or more specific database records, a hyperlink to a website or an ftp site. In some embodiments, identifier information may include a part number and/or part description, serial number, manufacturer identification, one or more dates (e.g., manufacturing date, last maintenance date), maintenance details, and the like. This information may be also used as pointers for retrieving additional information, such as maintenance information or, more generally, component information. In general, information, which pertains to a particular component, may be referred to as component information. Identifier information may be a part of component information. Component information may be stored in one or more identifiers, on-board memory of readers, servers, databases attached to the servers, and the like. Component information may include maintenance information, fabrication information, inspection records, and the like.

In some embodiments, identifier information is static and cannot be changed. A printed barcode is an example of an identifier that contains static information. Some identifiers may allow changing identifier information. Recordable or re-recordable RFID tags are examples of such identifiers. Identifier information may be limited to a few bits, such as 64 bits-1 kilobyte, or may be rather substantial, such as 2 kilobytes-128 kilobytes. Some large data capacity tags may be used to store some basic component information in addition to pointers for further information.

The reader used to obtain identifier information generally depends on the type of an identifier. For example, an RFID reader may be used to interrogate RFID tags, and a barcode reader or a camera may be used to scan linear barcodes and data matrices. The reader may include a communication module for maintaining wireless or wired communication to one or more servers, such as a maintenance server. For example, a reader may be communicatively coupled using an Ethernet connection, a Wi-Fi connection, and/or a cellular data connection. The reader may also include a memory module for storing certain information that can supplement the identifier information obtained by the reader from the identifier. In some embodiments, the memory module may include all or at least a part of the component information. For example, a reader may be a part of an aircraft maintenance facility that specializes in maintenance of a particular type of aircraft. The reader may have various maintenance manuals, wiring diagrams, and other like documents stored in its on-board memory. In some embodiments, a reader may pre-fetch information to its on-board memory based on some general instructions. For example, a reader may receive identifier information for an assembly, such as a tail number of an aircraft, and use this information to pre-fetch component-specific information for components of this assembly. In some embodiments, pre-fetching may be performed according to certain rules, such as limited to components that are subject to the next maintenance. Automated programming interfaces (APIs) may be developed to support combinations of features and functions, such as geographic location, next flight scheduled, departure times, flight plans, durations, and the like.

The reader may also include a user interface for presenting an output to the user. The user interface may be also used for adding data into the reader by the user. This added data may trigger updates of the identifier information and/or the component information. The updates to the component information may be stored in the on-board memory of the reader or transmitted to the server. The user interface may include various input/output devices, such as a display, keyboard, and mouse.

The reader is communicatively coupled to one or more servers, which include component information. In some embodiments, information corresponding to a component may be stored on multiple different servers, such as fabrication information may be stored on the server of an OEM, operation information may be stored on an airline server, maintenance information may be stored on one or more maintenance servers, and so on. Depending on the task at hand, the reader may choose which component information is needed and may contact corresponding servers. In some embodiments, a reader is communicatively coupled only to one server, which then sends requests on behalf of the reader to one or more other servers. The servers may belong to different entities. Different access levels may be given to different readers depending, for example, on their authentication credentials.

In some embodiments, one or more servers may be a part of an integrated end-to-end aircraft maintenance platform or an asset management platform. In general, any platform or a system used during the lifecycle of a component and sometimes beyond may be used for implementing methods of managing component information. The maintenance or other like platforms may be flexible, scalable and adaptable to the needs of customers and suppliers. The platforms may include tools for seamless development of maintenance services by different parties and seamless interaction between the actors, such as the aircraft operators, the OEMs and the maintenance, repair and overhaul organizations. In some embodiments, the maintenance platform allows creating and customizing individual service packages. Other platforms may be used during the lifecycle of the a component, such as fabrication platforms, installation platforms, spare part management platforms, warranty service platforms, and the like.

System Examples

FIG. 1 is a schematic illustration of a system 100 for managing component information during component lifecycle, in accordance with some embodiments. System 100 may be configured to manage production information, operation information, maintenance information, and other types of information described elsewhere in this document. In some embodiments, multiple types of information pertaining to the same component are managed by the same system.

System 100 may include multiple readers 102 and 104, each capable of obtaining identifier information from corresponding identifiers 112a and 112b. Readers 102 and 104 are communicatively coupled to servers 120, 130, and 140. In general, a system may include any number of readers and any number of servers. A reader or a set of readers may be coupled to one specific server that collects all requested information for this set of readers. For example, all readers used in a particular maintenance location may be coupled to a maintenance server, which is in turn communicatively coupled to an OEM server or an airline server. In some embodiments, a reader may be coupled to multiple different servers that may belong to different entities. For example, a reader may be coupled to a server storing fabrication information, a server storing assembly information, a server storing installation information, a server storing maintenance information, a server storing spare part number availability, ordering/expedite systems, a server storing digital geometry files, drawings, service history, interdependencies, warranty information, and the like. In some embodiments, different types of information may be available from the same server.

Identifiers 112a and 112b may be in a form of various data carriers or include one or more data carriers, such as barcodes, alphanumeric codes, RFID tags, and the like. In some embodiments, one identifier may include multiple data carriers, such as a combination of a barcode and an alphanumeric code, a combination of an alphanumeric code and an RFID tag, or a combination of QR code, a barcode, an alphanumeric code, and an RFID tag. Different data carriers may have the same information or at least some overlapping information. For example, an alphanumeric code may include only the serial number, while an RFID tag may include a part number, a serial number, and a manufacturer. Different data carriers allow using different types of readers. Specifically, any one type of the readers capable of obtaining information from these different data carriers may be used. For example, one type of the readers may be available at one location and used to obtain identification information from one of the data carriers and then another type of the readers may be available at another location and used to obtain the same or similar identification information from another one of the data carriers. Furthermore, multiple data carriers allow obtaining information even when one of the identifiers becomes inoperable. In some embodiments, one component may include multiple identifiers. Regardless of types and number of identifiers associated with a component, each component may have unique identifier information, e.g., a serial number.

As noted above, the identifier information provided on identifiers 112a and 112b may be static (e.g., printed alphanumeric codes or printed barcodes) or dynamic (e.g., recordable RFID tags). When identifiers 112a and 112b allow for dynamic identifier information, then readers 102 and 104 may not only obtain information from identifiers 112a and 112b but also supply information to identifiers 112a and 112b. For example, when maintenance on a component is completed, identifier information may be updated with the date and, in some embodiments, scope of this maintenance. Furthermore, a reader may receive instructions from a server to update identifier information.

Identifiers 112a and 112b are associated with components 110a and 110b. Identifiers 112a and 112b may be physically attached (e.g., affixed) to components 110a and 110b. For example, identifier 112a and 112b may be in a form of labels that are adhered to surfaces of components 110a and 110b. When RFID tags are used on RF permeable components, such as plastics, RFID tags may be embedded within the component, such as molded in to plastic components. Furthermore, identifiers 112a and 112b may be physically separated from components 110a and 110b but still associated with components 110a and 110b based on certain logical links.

Components 110a and 110b may be subjected to any of selection, delivery, fabrication, assembly, disassembly, inspection, maintenance, or other operations associate with lifecycle of the component. In some embodiments, components 110a and 110b are aircraft components, such as components of an aircraft airframe, components of an aircraft interior, components of an aircraft propulsion system, components of an aircraft hydraulic system, components of an aircraft electrical system, or components of an aircraft environmental system. Various examples of aircraft components and systems are described below with reference to FIG. 6.

As noted above, readers 102 and 104 are communicatively coupled to servers 120, 130, and 140. Various wireless and/or wired networks may be used for this purpose. Servers 120, 130, and 140 may include or be connected to databases 122, 132, and 142 for storing information to be supplied to readers 102 and 104 and, in some embodiments, received from readers.

Reader Examples

Figure 2:
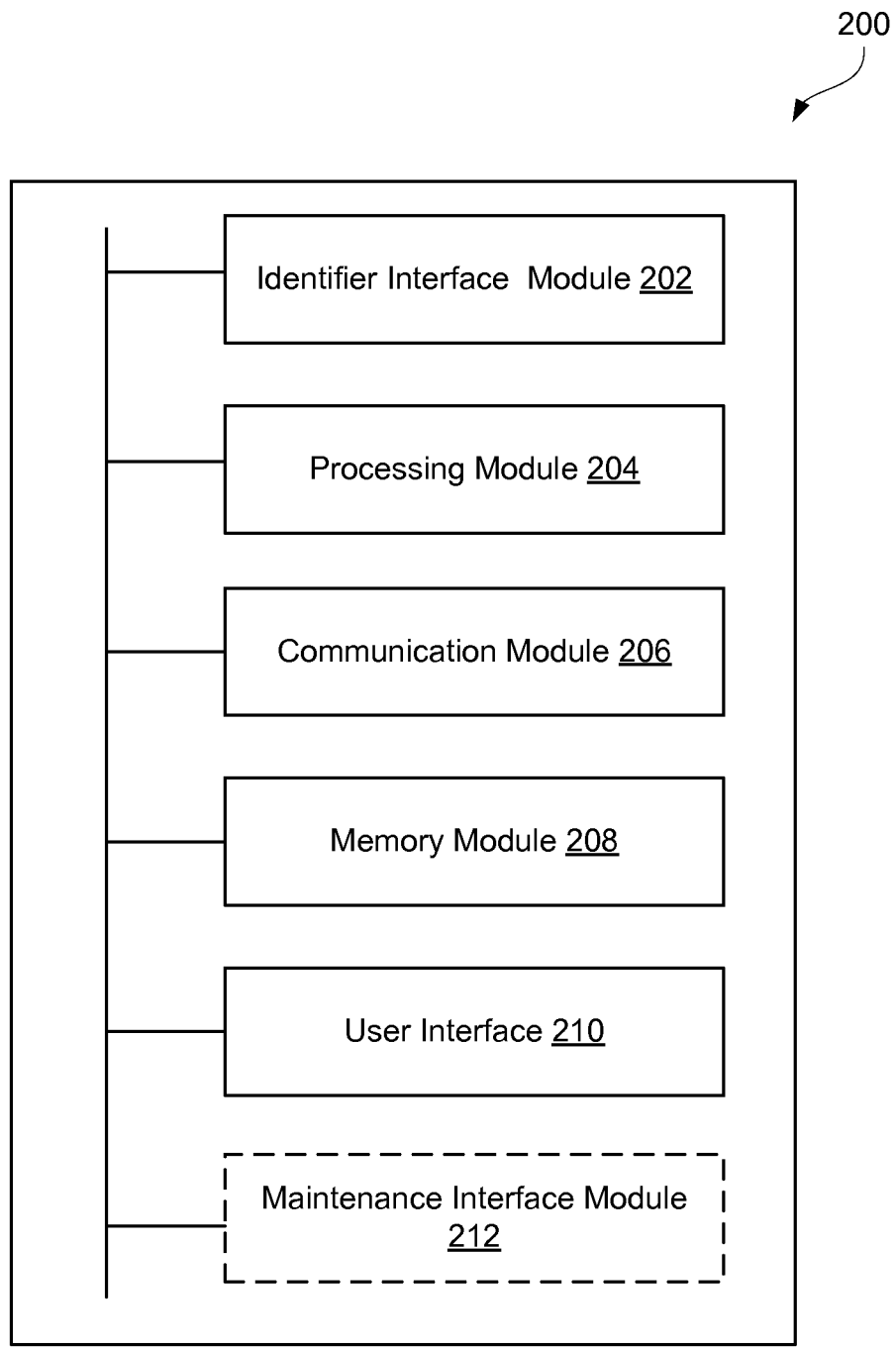
FIG. 2 is a schematic illustration of a reader for managing component information, in accordance with some embodiments.

FIG. 2 is a schematic illustration of a reader 200 for managing component information during component lifecycle, in accordance with some embodiments. Reader 200 includes identifier interface module 202, processing module 204, communication module 206, memory module 208, user interface 210, and, optionally, maintenance interface module 212 or other modules associated with lifecycle information, such as fabrication information, assembly information, installation information, spare part number availability, ordering/expedite systems, digital geometry files, drawings, service history, interdependencies, warranty information, available upgrades or alerts, required regulatory actions or notices. Reader 200 may be a data processing system, various examples of which are described below with reference to FIG. 7. Reader 200 may be in a form of a mobile communications device, a cell phone, a Personal Digital Assistant (PDA), a specially configured reader, and many others.

Identifier interface module 202 may be configured to obtain identifier information from identifiers. Identifier interface module 202 may be a barcode scanner, an RFID reader, a camera, or any other suitable device. In some embodiments, identifier interface module 202 may be capable of extracting identifier information and passing this information to other modules of reader 200. For example, identifier interface module 202 may include its own processor for decoding barcodes, alphanumeric images, RFID signals, and the like. In other embodiments, information obtained by identifier interface module 202 is passed to processing module 204 for extraction of identifier information. For example, identifier interface module 202 may be a camera that captures an image of a barcode or an image of an alphanumeric code. This image is then sent to processing module 204 for data extraction. Identifier interface module 202 may be permanently integrated into reader 200 or removably attached to reader 200.

Memory module 208 may be used to store on-board component information, computer program instructions, and other types of information. Memory module 208 may be sometimes referred to as on-board memory. In some embodiments, memory module 208 may include a computer usable medium having a computer readable program code embodied therein. This computer readable program code may be adapted to be executed to implement the method for managing component information during component lifecycle.

Processing module 204 may be configured to analyze the identifier information in order to determine availability of needed component information, such as maintenance information, fabrication information, assembly information, installation information, and the like, in memory module 208. Furthermore, processing module 204 may be used to extract identifier information from information obtained by identifier interface module 202 as described above. Processing module 204 may be configured to execute the computer readable program code that may be stored in memory module. Specifically, processing module 204 may include a computer processor and set of instructions to execute various operations of the method for managing component information during component lifecycle.

Communication module 206 is configured to communicatively couple reader 200 with one or more servers for updating, retrieving, and/or storing component information. Communication module 206 may include a wireless or wired modem or network card. Various communication interfaces may be used, such as Ethernet interfaces, frame relay interfaces, cable interfaces, digital subscriber line (DSL) interfaces, token ring interfaces, and the like. In addition, various very high-speed interfaces may be provided, such as fast Ethernet interfaces, Gigabit Ethernet interfaces, Asynchronous Transfer Mode (ATM) interfaces, High-Speed Serial Interface (HSSI) interfaces, packets over SONET (POS) interfaces, Fibre Distributed Data Interface (FDDI) interfaces and the like. In some cases, they may also include an independent processor and, in some instances, volatile RAM. The independent processors may control such communications intensive tasks as packet switching, media control and management.

User interface 210 is configured to present an output to a user and, in some embodiments, to collect input from the user. User interface 210 may include a display, such as a touch screen display, a keypad, a mouse, and other types of human machine interface (HMI) input and output devices.

In some embodiments, reader 200 also includes maintenance interface module 212 and/or other like modules. Maintenance interface module 212 may interface with various maintenance or fabrication equipment and may contain, in addition to or instead of memory module 208, maintenance information. Maintenance interface module 212 may be removable from reader 200. In this example, different maintenance interface modules may be coupled to reader 200 depending, for example, on the type of maintenance or fabrication performed or the type of the component. As such, maintenance interface module 212 may be used to configure reader 200 for a particular maintenance or fabrication task. Other types of modules includes fabrication interface module, assembly interface module, installation interface module, spare part interface module, ordering/expedite interface module, digital geometry file interface module, drawings interface module, service history interface module, warranty interdependencies.

Processing Examples

Figure 3:
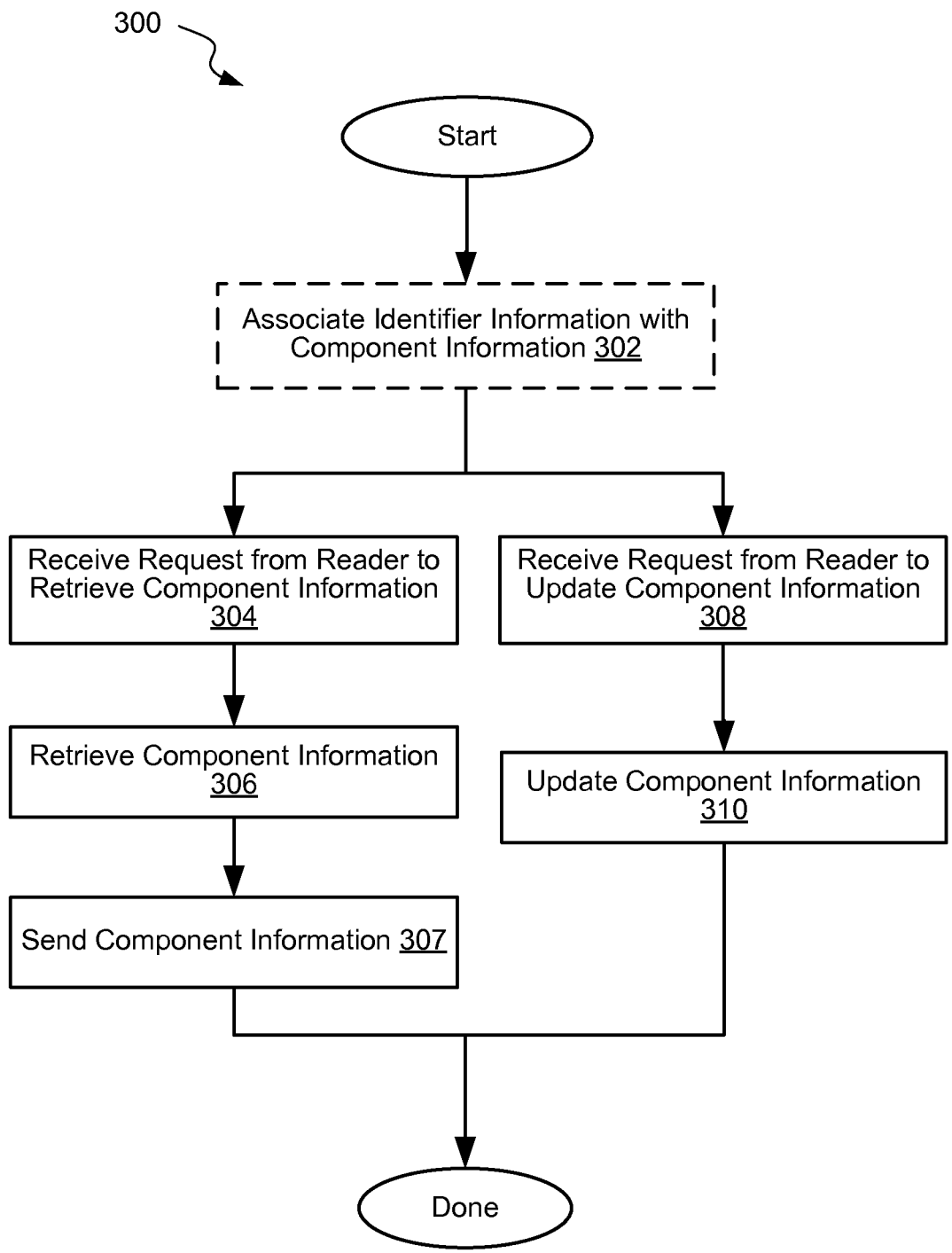
FIG. 3 is a process flowchart corresponding to a method for managing component information at a server, in accordance with some embodiments.

FIG. 3 is a process flowchart corresponding to a method 300 of managing component information during component lifecycle at a server, in accordance with some embodiments. The server may be managed by a manufacturer of the component, an integrator (e.g., an aircraft manufacturer), an operator (e.g., an airline), a maintenance provider, or any other party. In some embodiments, method 300 may be implemented on a group of servers.

Method 300 may start with associating identifier information with component information during optional operation 302. The identifier information may be the same as information available on the identifier associated with a component. In some embodiments, the identifier information on the server may correspond but differ from the identifier information on the actual identifier. The component information available on the server may include maintenance information, such as maintenance instructions, maintenance history, part fabrication history, and aircraft assembly history. Other types of information include fabrication information, assembly information, installation information, spare part number availability, ordering/expedite systems, digital geometry files, drawings, service history, interdependencies, warranty information, available upgrades or alerts, required regulatory actions or notices. In some embodiments, the same identifier information is associated with multiple different sets of component information available from the same server or different servers. For example, multiple different components may share the same maintenance manual.

Method 300 may proceed with receiving a request from a reader to retrieve component information during operation 304. The request may include identifier information. In some embodiments, a server that includes requested component information is determined (from a set of multiple servers) based on the identifier information. For example, the identifier information may include a pointer to a specific server. Furthermore, the request may include information about the reader that has sent this request. This information may be used by the server to authenticate the request. In some embodiments, the request received by the server and/or response sent by the server may be encrypted to ensure data security.

Method 300 may proceed with retrieving the requested component information during operation 306. This component information is associated with the identifier information. In some embodiments, operation 306 involves selecting a portion of all component information associated with the identifier information and available on one or more servers. For example, the request may be generated by the reader before proceeding with maintenance of a component. In response to this request, the server may select information containing maintenance procedures, such as selecting instructions from the maintenance manual that need to be followed rather than sending the entire manual. At the same time, fabrication information may be ignored in this example. The retrieved information may then be sent to the reader during operation 307. As noted above the response may be encrypted. In some embodiments, the response may be sent over the Internet.

In some embodiments, method 300 may involve receiving a request for updating component information during operation 308. This request may be received from a reader or some other device of the system. For example, a certain maintenance operation may have been performed on the component and the reader sends a request updating the server about this completion. In another example, the OEM server may update fabrication information after the part has been transferred into use. The server then proceeds with updating component information during operation 310.

Figure 4:
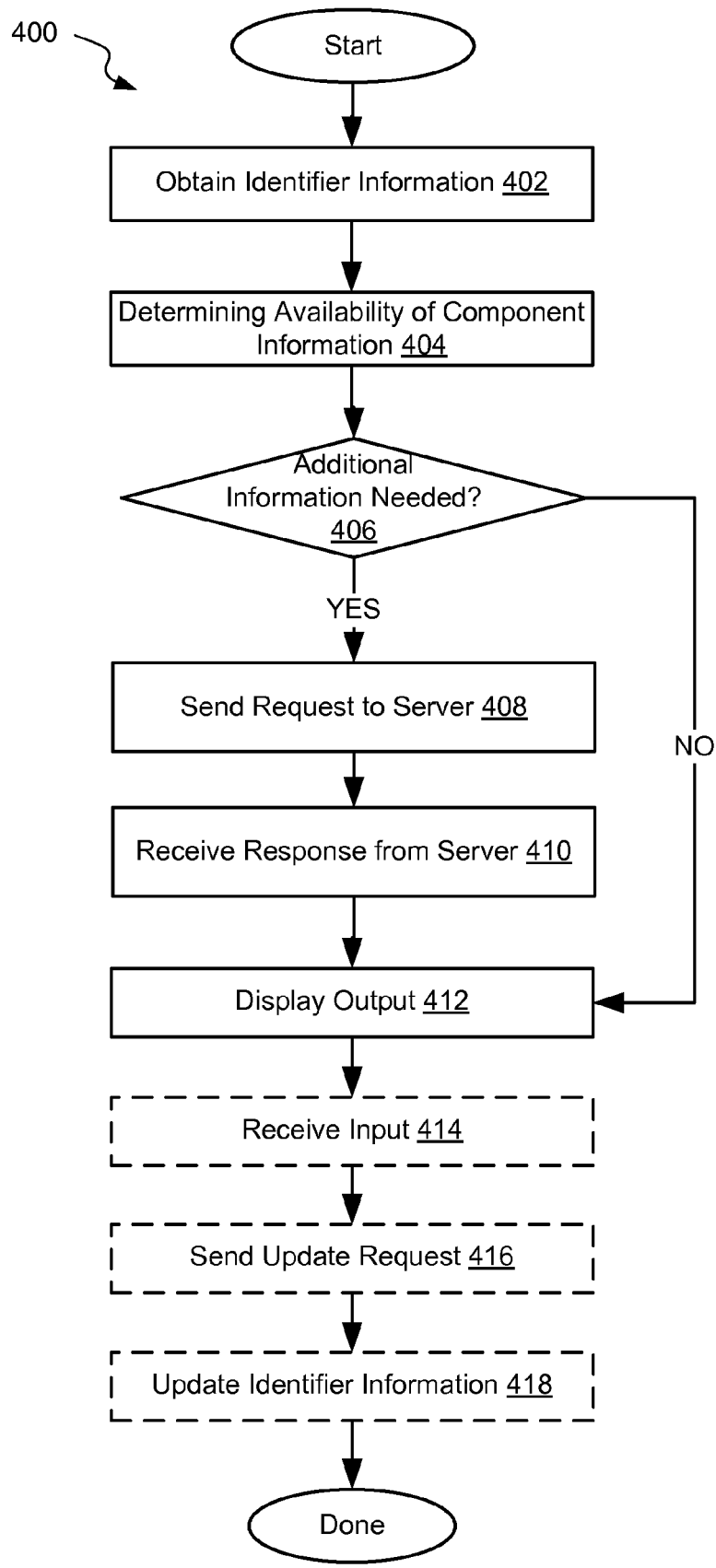
FIG. 4 is a process flowchart corresponding to a method of managing component information on a reader, in accordance with some embodiments.

FIG. 4 is a process flowchart corresponding to a method 400 of managing component information during component lifecycle using a reader, in accordance with some embodiments. Method 400 may be used during fabrication, assembly, maintenance, operation, or other uses of various components as well as during inspection, operation, and other processes of these articles. While the following description focuses on maintenance of aircraft components, method 400 may be applied to other types of components and processes performed on these components.

Method 400 may start with obtaining identifier information from an identifier during operation 402. The identifier is associated with a component that may be subject to fabrication, maintenance, assembly, or other types of processing. Various identifiers may be used, such as linear barcodes, data matrices, alpha-numerical codes, RFID tags, and the like. For example, a UHF RFID tag may be used. The identifier information may be obtained using a reader operable to work with a particular identifier type. For example, an RFID reader may be used to interrogate RFID tags, barcode readers are used to scan barcode tags and, in some embodiments, alpha-numerical codes. Likewise, cameras may be used to capture images of various printed identifiers and then process these images to retrieve identifier information.

The identifier information may be obtained automatically by the reader, e.g., by interrogating an RFID tag or scanning QR code or a barcode. In some situations, the identifier information may be entered manually. For example, a user may enter an alphanumeric code (printed on the identifier) on a user interface of the reader. In some embodiments, the same information may be presented in multiple different formats, e.g., encoded in an RFID tag, encoded in a printed QR code or a barcode, and presented as a printed alphanumeric code. This redundancy may be used to accommodate different reader types and as backups when one type of data carrier is not operable.

As noted above, the reader has an on-board memory capable of storing information about articles, such as fabrication information, assembly information, installation information, maintenance information, spare part number availability, ordering/expedite systems, digital geometry files, drawings, service history, interdependencies, warranty information, available upgrades or alerts, required regulatory actions or notices. For example, a reader used for aircraft maintenance may have maintenance manuals uploaded to the memory of the reader. However, some information may not be available in the reader's on-board memory. For example, part-specific information, such as maintenance and/or fabricator and/or assembly history of a specific part, may not be available in the reader's on-board memory for every possible part. To obtain this information, the reader may be communicatively coupled to one or more servers for obtaining necessary information. The reader may be communicatively coupled to one or more maintenance servers for obtaining prior maintenance logs. In some embodiments, information is prefetched to the reader's on-board memory based on input other than the identifier information. For example, a maintenance schedule that has identification of a particular aircraft and its components may be used to schedule downloads of the necessary data.

After the reader has obtained the identifier information during operation 402, method 400 may proceed with determining availability of component information in the on-board memory of the reader during operation 404. Examples of component information include fabrication history information (such as supplier name, fabrication date, installation date, assembly date, serial number, lot number, and the like), maintenance history information (such as dates of previous maintenance, tasks performed, and the like), upcoming maintenance information (such as future maintenance dates and tasks), component recalls and replacements, and other such information. In some embodiments, the component information, which is being searched for during operation 404, may be determined by various inputs previously provided to the reader or available at the reader. For example, prior to operation 404, the reader may receive an input on types of tasks that are about to be performed on the component, such as maintenance task, repair task, replacement task, or some other task. In some embodiments, the component information includes maintenance information.

If the component information that is being searched for is not available in the on-board memory of the reader as shown by decision block 406, then the method may proceed with sending a request to a server for the component information during operation 408. In some embodiments, multiple requests are sent to multiple different servers. For example, one server may have fabrication and/or installation history information, another server may have maintenance history information, and yet another server may have maintenance manuals outlining details of future tasks. Alternatively, a single request may be sent to a server, which then redistributes this request to other servers or generates new requests.

The reader may receive one or more responses from the servers during operation 410. The responses may be analyzed to determine sufficiency of information and additional requests may be generated if necessary. Information contained in received responses may be combined with information available on the reader to provide a response. Method 400 may proceed with displaying output to the user during operation 412. For example, the displayed output may include previous maintenance records, instructions for future maintenance, and other such information.

In some embodiments, method 400 may proceed with the reader receiving input from the user during optional operation 414. For example, the user may complete certain maintenance operations and provide reports to the reader about completing these operations. Furthermore, the user may have certain findings and/or test data about the components that may be parts of this input. The reader may save this input locally in the on-board memory of the reader and/or send one or more update requests to the servers as indicated by optional operation 416. When the identifier associated with the component allows adding new information or changing previous identifier information as, for example, in the case with rewritable RFID tags, method 400 may proceed with updating the identifier information during operation 418.

Examples of Aircrafts

Figure 5:
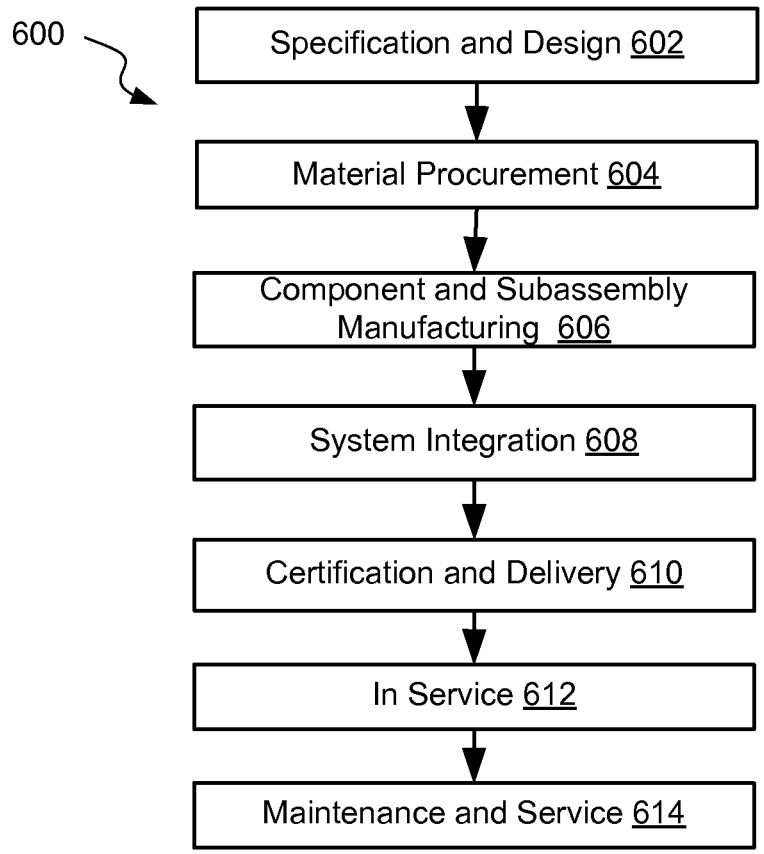
FIG. 5 is a process flowchart corresponding to a method for aircraft manufacturing and service, in accordance with some embodiments.

An aircraft manufacturing and service method 600 shown in FIG. 5 and an aircraft 630 shown in FIG. 6 will now be described to better illustrate various features of processes and systems presented herein. Specifically, FIG. 5 illustrates a typical lifecycle of an aircraft and its components. Various component information may be generated and managed during this lifecycle, such as fabrication information, assembly information, installation information, maintenance information, spare part number availability, ordering/expedite systems, digital geometry files, drawings, service history, interdependencies, warranty information, available upgrades or alerts, required regulatory actions or notices. During pre-production, aircraft manufacturing and service method 600 may include specification and design 602 of aircraft 630 and material procurement 604. The production phase involves component and subassembly manufacturing 606 and system integration 608 of aircraft 630. Identifiers may be associated with aircraft components during any one of these operations. Thereafter, aircraft 630 may go through certification and delivery 610 in order to be placed in service 612. At this point certain component information may be transferred from the aircraft manufacturer to the aircraft operator. In some embodiments, the aircraft manufacturer continues to maintain some component information even after delivering the aircraft to the operator. While in service by a customer, aircraft 630 is scheduled for routine maintenance and service 614 (which may also include modification, reconfiguration, refurbishment, and so on). While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 6:
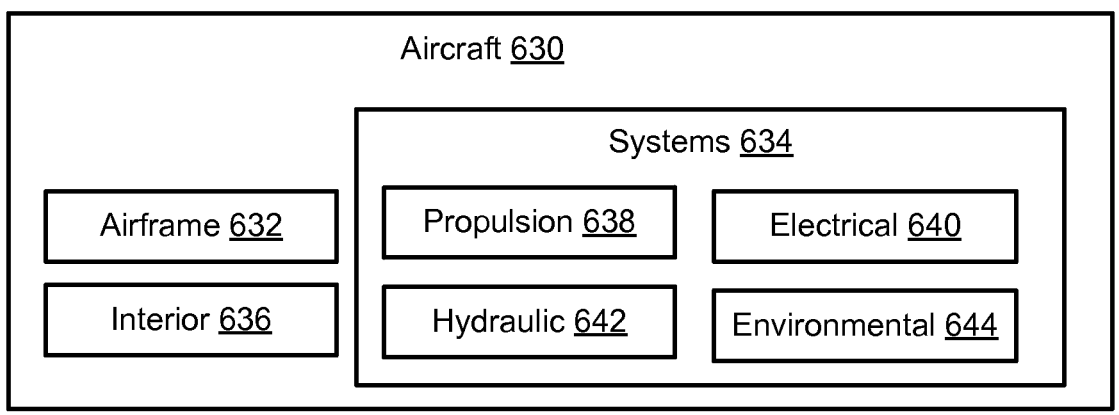
FIG. 6 is a schematic illustration of an aircraft including various components subject to maintenance, in accordance with some embodiments.

As shown in FIG. 6, aircraft 630 produced by aircraft manufacturing and service method 600 may include airframe 632, interior 636, and multiple systems 634 and interior 636. Examples of systems 634 include one or more of propulsion system 638, electrical system 640, hydraulic system 642, and environmental system 644. Any number of other systems may be included in this example. Although an aircraft example is shown, the principles of the disclosure may be applied to other industries, such as the automotive industry.

Also, the provided methods and systems may be utilized during component and subassembly manufacturing 606 and system integration 608, for example, without limitation, by substantially expediting assembly of or reducing the cost of aircraft 630. Similarly, the methods and systems may be utilized while aircraft 630 is in service. For example, maintenance and service 614 may be used during system integration 608 and/or maintenance and service 614 to determine whether parts may be connected and/or mated to each other.

Examples of Controller Computer Systems

Figure 7:
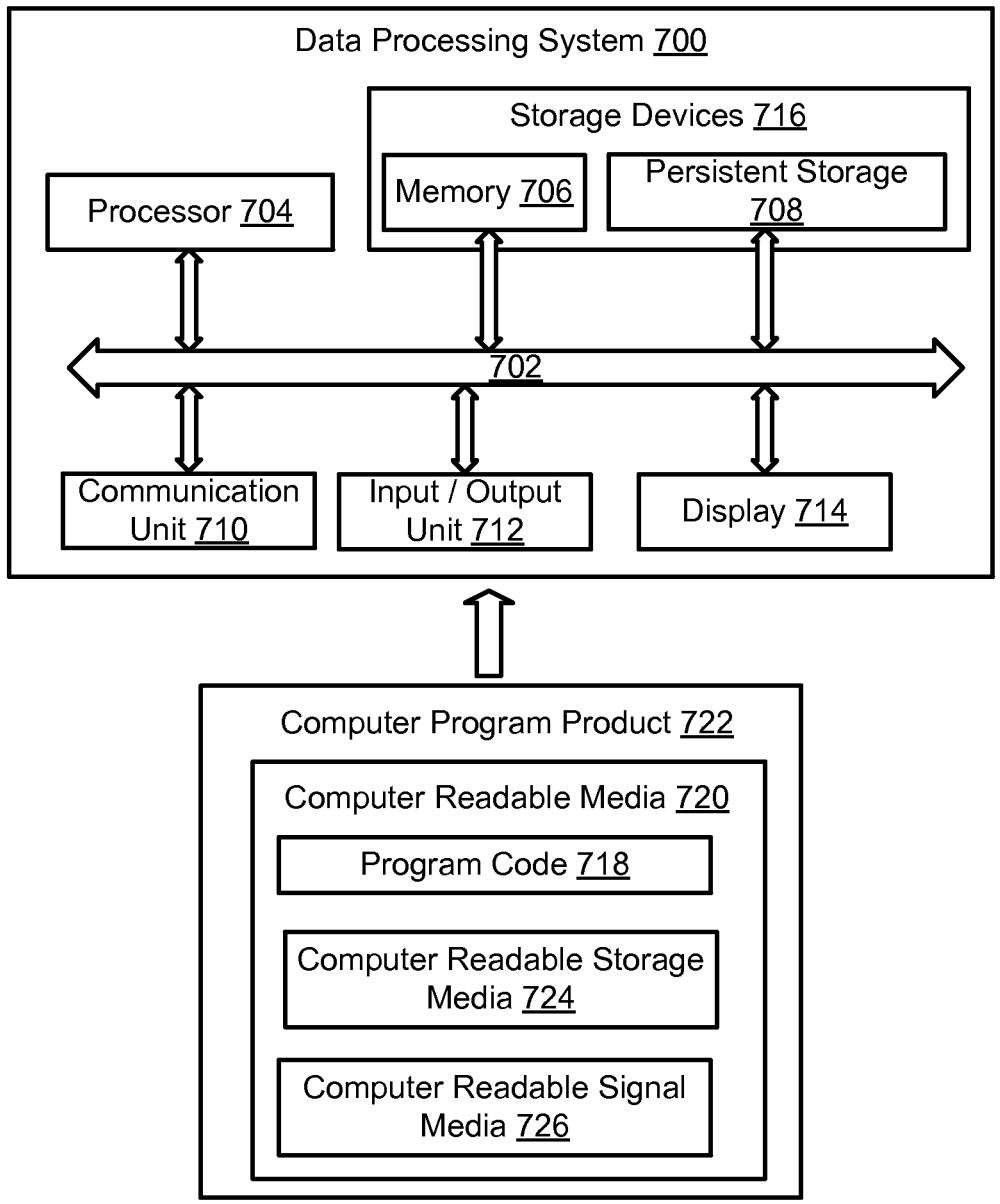
FIG. 7 is a schematic illustration of a data processing system, in accordance with some embodiments.

Turning now to FIG. 7, an illustration of a data processing system 700 is depicted in accordance with some embodiments. Data processing system 700 may be used to implement one or more computers used in a controller or other components of various systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card. Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program component 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method for managing component information during component lifecycle of an aircraft, the method comprising:
    obtaining identifier information from an identifier,
        the identifier is associated with a component of the aircraft,
        the component being subject to maintenance,
        the identifier information obtained using a reader;
    determining availability of maintenance information in an on-board memory of the reader,
        wherein the on-board memory comprises pre-fetched information for the Aircraft,
        the maintenance information corresponding to the identifier information;
    if the maintenance information is not available in the on-board memory of the reader, sending a request to a maintenance server for the maintenance information and receiving a response from the maintenance server corresponding to the request; and
    presenting an output on a user interface of the reader,
        the output comprising one or more data selected from the group consisting of the identifier information, the maintenance information, and the response received from the maintenance server.

2. The method of claim 1, further comprising sending a request to update the maintenance information to the maintenance server.

3. The method of claim 2, wherein at least a portion of the request to update the maintenance information is generated automatically by the reader.

4. The method of claim 3, wherein the automatically generated portion of the request to update the maintenance information comprises one or more data selected from the group consisting of a current date, an identification of the reader, and an identification of a user of the reader.

5. The method of claim 2, wherein at least a portion of the request to update the maintenance information comprises data added by a user of the reader.

6. The method of claim 1, further comprising verifying a version of the maintenance information available on the on-board memory of the reader.

7. The method of claim 1, wherein the identifier is selected from the group consisting of a radio frequency identification (RFID) tag and a barcode.

8. The method of claim 1, wherein the output presented on the user interface of the reader comprises information selected from the group consisting of maintenance instructions, maintenance history, component fabrication history, and aircraft assembly history.

9. The method of claim 1, further comprising updating the identifier information.

10. The method of claim 1, further comprising authenticating the request by the maintenance server.

11. The method of claim 1, wherein the response received from the server is encrypted.

12. The method of claim 1, wherein the request is sent and the response is received over the Internet.

13. The method of claim 1, wherein the component is an aircraft component.

14. The method of claim 1, wherein the component is an aircraft component installed on an aircraft.

15. The method of claim 1, wherein obtaining the identifier information comprises interrogating the identifier using an RFID reader.

16. A method for managing component information during component lifecycle of an aircraft, the method comprising:
    pre-fetching information to the reader;
    receiving a first request for retrieving maintenance information,
        the first request received from a reader,
        the first request comprising identifier information;
    retrieving the maintenance information from a database associated with the aircraft,
        the maintenance information associated to the identifier information,
        the maintenance information comprising data selected from the group consisting of maintenance instructions, maintenance history, component fabrication history, and aircraft assembly history; and sending the maintenance information to the reader.

17. The method of claim 16, further comprising receiving, from the reader, a second request for updating the maintenance information and updating the maintenance information in the database to create updated maintenance information.

18. The method of claim 17, sending the updated maintenance information to an additional reader.

19. The method of claim 16, further comprising receiving additional identifier information and associating the additional identifier information with the maintenance information.

20. A computer system for managing component information during component lifecycle of the aircraft, the computer system comprising:
- an identifier interface module for obtaining identifier information from an identifier,
- a memory module for storing local maintenance information pre-fetched to the computer system;
- a processing module for analyzing the identifier information to determine availability of maintenance information within the pre-fetched information in the memory module;
- a communication module for sending a request to a maintenance server for the maintenance information and for receiving a response from the maintenance server; and
- a user interface for displaying an output, the output comprising one or more data selected from the group consisting of the identifier information, the maintenance information, and the response from the maintenance server.

* * * * *